T. G. Moore,
Bridle.
No. 98,514. Patented Jan. 4, 1870.
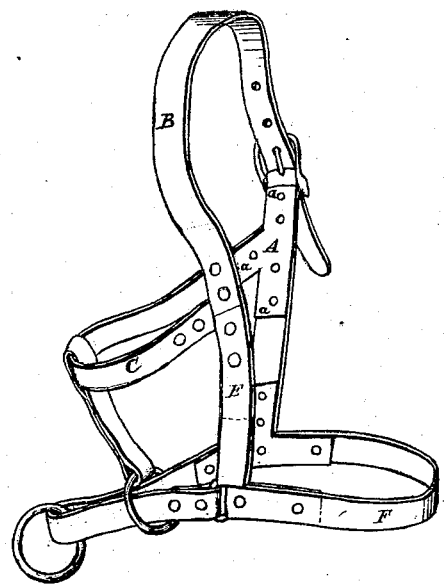
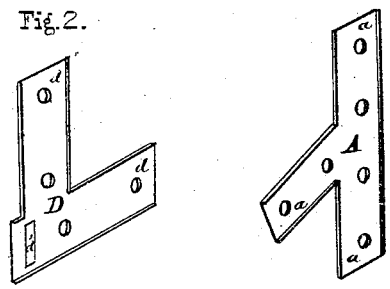
Witnesses.
Inventor.

United States Patent Office.

T. G. MOORE, OF ALBIA, IOWA.

Letters Patent No. 98,514, dated January 4, 1870.

IMPROVED LEATHER-FASTENING FOR HARNESS.

The Schedule referred to in these Letters Patent and making part of the same.

*To all whom it may concern:*

Be it known that I, T. G. MOORE, of Albia, in the county of Monroe, and in the State of Iowa, have invented certain new and useful Improvements in Fastenings for Bridle, Halter, and other Straps; and do hereby declare that the following is a full, clear, and exact description thereof, reference being had to the accompanying drawing, making a part of this specification, in which—

Figure 1 is a perspective view of a halter, with the straps connected by my device; and Figures 2 and 3 are like views of the fastening-plates detached.

Letters of like name and kind refer to like parts in each of the figures.

My invention has for its object the connecting together of the various portions of a halter, bridle, &c.; and to this end, It consists in the employment of a flange-plate of sheet-metal, corresponding in width and shape with, and secured to the straps at their junction, as is hereinafter specified.

In the annexed drawing—

A represents a plate of sheet-metal, having three arms, $a$, which correspond in width with the head and throat-straps B and C, respectively, and have the same relative angles as said straps, at their junction.

The outer edges of the plate A are provided with a flange, which extends upward beside the edges of the straps, and materially adds to the strength of said plate.

As thus constructed, the ends of the straps are placed within the plate, and secured thereto by means of two or more rivets passing through each arm of said plate.

In fig. 2 is seen another plate, D, for use in connecting the cheek and nose-straps E and F, respectively, having but two arms, $d$, to which are secured, as before, said cheek-strap, and the upper half of said nose-strap, while the under part of the latter has its ends passed through suitable loops, $d'$, within the plate, and then doubled back and riveted.

By the use of plates A and D, equal strength and increased durability are secured, while, at the same time, a cheaper article is produced, as the straps being more easily connected together, a saving in time results, and requiring so much less strength than in ordinary halters, greater economy can be exercised in cutting the leather.

Having thus fully set forth the nature and merits of my invention,

What I claim as new, and desire to secure by Letters Patent, is—

The flanged plates A and D, when constructed substantially as described, and for the purpose specified.

In testimony that I claim the foregoing, I have hereunto set my hand, this 28th day of October, 1869.

T. G. MOORE.

Witnesses:
D. COZIER,
GEO. W. CRAMER.